(No Model.)

W. W. DOOLITTLE.
MANIFOLD PIPE JOINT.

No. 264,936. Patented Sept. 26, 1882.

Witnesses:

Inventor:
William W. Doolittle

UNITED STATES PATENT OFFICE.

WILLIAM W. DOOLITTLE, OF CHICAGO, ILLINOIS.

MANIFOLD PIPE-JOINT.

SPECIFICATION forming part of Letters Patent No. 264,936, dated September 26, 1882.

Application filed June 12, 1882. (No model.)

*To all whom it may concern:*

Be it known that I, WM. W. DOOLITTLE, residing at Chicago, in the county of Cook and State of Illinois, and a citizen of the United States, have invented a new and useful Improvement in Manifold Pipe-Joints, of which the following is a full description, reference being had to the accompanying drawings, in which—

Figure 1:
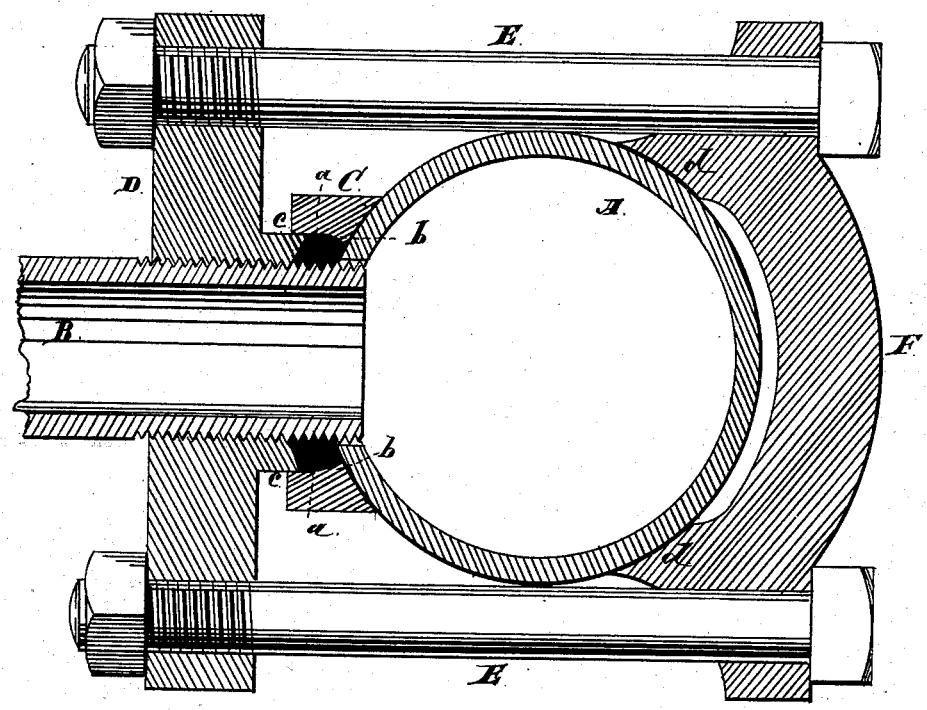
Figure 2:
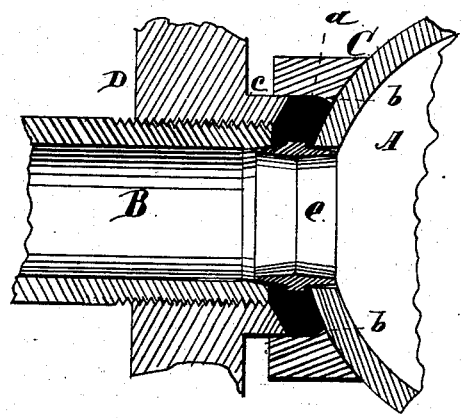

Figure 1 is a vertical section. Fig. 2 is a modification.

In gas condensers and evaporators it is common to use a number of coils, each coil being connected with a main pipe by means of a branch pipe, which connection is made by means of a nipple inserted in the side of the main pipe, and a coupling to connect the nipple and branch pipe. This requires a main pipe of considerable thickness, and great care is required in fitting and securing the nipple in place to prevent leakage.

The object of my invention is to provide improved devices for connecting the branch pipe with a main pipe, which I accomplish as hereinafter set forth.

In the drawings, A represents a main pipe having upon one side an opening of suitable size for the proposed branch pipe B, the inner end of which, as shown, enters such opening.

C is an annular ring, one end of which is so formed as to fit upon the pipe A. This ring is of such diameter that its interior diameter is somewhat larger than the pipe B, so that when the parts are all in position there will be considerable space between the exterior of the branch pipe B and the interior of the ring C for the purpose of receiving a packing-ring, *a*. I prefer to curve the inner wall of the ring C inward a little at the inner end, where the ring comes in contact with the pipe A, as shown at *b*, so that the packing will have a tendency to hold the ring C in place against the pipe A.

D is a gland, having projections *c* to come in contact with the packing-ring *a*. The gland is also provided with a central screw-threaded opening to receive the screw-threaded end of the branch pipe B, and also with holes to receive the bolts E.

F is a clamping-iron, which, as shown, comes in contact with the exterior of the pipe A at two points, *d*; but I do not limit myself to this specific construction. The clamp F is also provided with holes to receive the bolts E.

In using my improvement, as shown in Fig. 1, the branch pipe B is to be inserted into the central opening in the gland D, the inner end of such pipe B extending beyond the gland, so that such end will enter the opening in the pipe A. Then the ring C, the packing-ring *a*, gland D, and pipe B are secured in place by means of a clamp and bolts, as shown in Fig. 1. Instead of the clamp F and bolts shown, a clevis might be used.

In Fig. 2 I have shown a slight modification of my improvement, the principle, however, being the same. In this case the branch pipe B does not extend through the gland into the opening in the main pipe A, and hence I here use an inner ring, *e*, which serves as a wall to support one side of the packing. The use of this modification will be understood from the drawings without further description.

It is not important to curve the inner wall of the ring C, as described, and when this is done it will be advisable to curve only the two opposite sides shown in the drawings, leaving the greater portion of the inner wall straight, thus partly equalizing the space for the packing-ring.

What I claim as new, and desire to secure by Letters Patent, is as follows:

In combination with a main pipe, A, and a branch pipe, B, a ring, C, packing-ring *a*, gland D, and a clamping device, all substantially as and for the purpose specified.

WILLIAM W. DOOLITTLE.

Witnesses:
 E. A. WEST,
 ALBERT H. ADAMS.